(12) United States Patent
Szubbocsev

(10) Patent No.: US 10,540,274 B2
(45) Date of Patent: Jan. 21, 2020

(54) MEMORY DEVICES INCLUDING DYNAMIC SUPERBLOCKS, AND RELATED METHODS AND ELECTRONIC SYSTEMS

(71) Applicant: Micron Technology, Inc., Boise, ID (US)

(72) Inventor: Zoltan Szubbocsev, Heimhausen (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/084,187

(22) Filed: Mar. 29, 2016

(65) Prior Publication Data
US 2017/0286286 A1 Oct. 5, 2017

(51) Int. Cl.
*G06F 12/02* (2006.01)
*G06F 3/06* (2006.01)

(52) U.S. Cl.
CPC .......... *G06F 12/0246* (2013.01); *G06F 3/064* (2013.01); *G06F 3/0652* (2013.01); *G06F 3/0688* (2013.01); *G06F 2212/1044* (2013.01); *G06F 2212/2022* (2013.01); *G06F 2212/7201* (2013.01); *G06F 2212/7205* (2013.01)

(58) Field of Classification Search
CPC ...... G06F 3/0608; G06F 3/064; G06F 3/0652; G06F 3/0688; G06F 12/1009
See application file for complete search history.

(56) References Cited

U.S. PATENT DOCUMENTS

| | | | |
|---|---|---|---|
| 8,769,190 B1 | 7/2014 | Syu et al. | |
| 8,832,507 B2 | 9/2014 | Post et al. | |
| 8,924,638 B2 | 12/2014 | Carannante et al. | |
| 9,032,177 B2 | 5/2015 | Alcantara et al. | |
| 2008/0109590 A1 | 5/2008 | Jung et al. | |
| 2008/0307192 A1* | 12/2008 | Sinclair | G06F 12/0246 711/218 |
| 2011/0283049 A1 | 11/2011 | Kang et al. | |
| 2012/0047409 A1 | 2/2012 | Post et al. | |
| 2014/0156911 A1 | 6/2014 | Alcantara et al. | |

(Continued)

FOREIGN PATENT DOCUMENTS

| | | |
|---|---|---|
| TW | I370969 B | 8/2012 |
| WO | 2007081598 A2 | 7/2007 |

OTHER PUBLICATIONS

International Search Report from International Application No. PCT/US2017/021071, dated Jun. 12, 2017, 3 pages.

(Continued)

*Primary Examiner* — Ryan Bertram
*Assistant Examiner* — Trang K Ta
(74) *Attorney, Agent, or Firm* — TraskBritt

(57) ABSTRACT

A memory device includes a memory array having non-volatile memory cells, and a memory controller configured to dynamically construct a superblock during each garbage collection process based, at least in part, on an amount of valid data present in each physical block of the memory array. Another memory device includes physical blocks of memory cells and a memory controller configured to construct a new superblock dynamically each time garbage collection occurs for the physical blocks regardless of whether any physical blocks are determined to be bad. Additional methods for managing operation of a memory device and related electronic systems are also described.

21 Claims, 8 Drawing Sheets

(56) References Cited

U.S. PATENT DOCUMENTS

| | | | |
|---|---|---|---|
| 2015/0161042 A1* | 6/2015 | Liang | G06F 12/0253 |
| | | | 711/103 |
| 2015/0193300 A1 | 7/2015 | Shalvi et al. | |
| 2015/0212735 A1 | 7/2015 | Alcantara et al. | |
| 2015/0212937 A1 | 7/2015 | Stephens | |
| 2015/0317326 A1 | 11/2015 | Bandarupalli et al. | |
| 2015/0324282 A1 | 11/2015 | Seekins et al. | |
| 2015/0370701 A1 | 12/2015 | Higgins et al. | |
| 2016/0179372 A1* | 6/2016 | Sinclair | G06F 3/061 |
| | | | 711/103 |
| 2016/0283138 A1* | 9/2016 | Lehman | G06F 3/064 |
| 2017/0060428 A1* | 3/2017 | Lee | G06F 3/0616 |
| 2017/0123972 A1* | 5/2017 | Gopinath | G06F 12/0253 |
| 2017/0132125 A1* | 5/2017 | Cai | G06F 3/061 |
| 2017/0220472 A1* | 8/2017 | You | G06F 12/0868 |

OTHER PUBLICATIONS

International Written Opinion from International Application No. PCT/US2017/021071, dated Jun. 12, 2017, 11 pages.

Pratibha et al., Efficient Flash Translation Layer for Flash Memory, International Journal of Scientific and Research Publications, vol. 3, Issue 4, Apr. 2013, pp. 1-6.

Qin et al., MNFTL: An Efficient Flash Translation Layers for MLC NAND Flash Memory Storage Systems, Design Automation Conference (DAC), 2011 48th ACM/EDAC/IEEE, Jun. 5-9, 2011, pp. 17-22.

Taiwanese Search Report, dated Dec. 28, 2017, and Office Action, dated Dec. 29, 2017, from Taiwanese Application No. 106110361, 20 pages with English translation.

Cai et al., U.S. Appl. No. 62/252,140, titled Write Amplification Reduction via Selective Data Recycling filed Nov. 6, 2015.

Taiwanese Search Report and Written Opinion from Taiwanese Application No. 106110361, dated Jun. 25, 2018, 27 pages with English translation.

Taiwanese Office Action from Taiwanese Application No. 106110361, dated Nov. 14, 2018, 23 pages.

European Search Report and Search Opinion Received for EP Application No. 17776259.8, dated Oct. 14, 2019, 7 pages.

* cited by examiner

MEMORY DEVICES INCLUDING DYNAMIC SUPERBLOCKS, AND RELATED METHODS AND ELECTRONIC SYSTEMS

TECHNICAL FIELD

The disclosure, in various embodiments, relates generally to the field of memory device management. More specifically, the disclosure relates to memory devices including flash translation layers constructing dynamic superblocks for garbage collection, and to related methods and electronic systems.

BACKGROUND

Non-volatile memory is commonly used for mass storage of data (e.g., music, videos, photos, and other data), such as within consumer electronic devices. Flash memory (e.g., NAND Flash) has become ubiquitous as non-volatile storage used within mobile consumer electronics due to its low power consumption and superior performance.

During operation of the non-volatile memory, free space may need to be created as new data is written and old data remains un-erased. Memory processes to create free space often requires relocating valid data into different parts of the memory array in order to more efficiently use the memory array for subsequent writing operations. Conventional systems maintain virtual blocks that map to physical blocks within the memory array, and such virtual blocks are often statically constructed within the firmware of the memory device each time that free space is needed. This static construction may lead to less efficient management of relocation of data when blocks are erased that have greater amounts of valid data than needed to be relocated in comparison with other blocks that may be linked to different virtual blocks.

DETAILED DESCRIPTION

Figure 1:
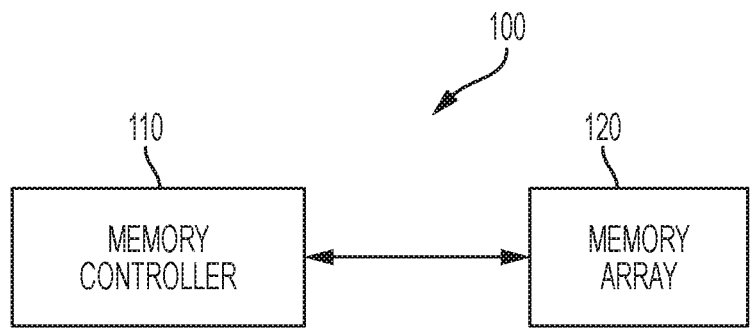
FIG. 1 is a schematic block diagram of a memory device according to embodiments of the present disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

Memory devices (e.g., including memory arrays divided into blocks) are described, as are related methods of operation and electronic systems. In some embodiments, a memory device comprises a memory array having non-volatile memory cells, and a memory controller operably coupled to the memory array. The memory controller is configured to dynamically construct a superblock during each garbage collection process based, at least in part, on an amount of valid data present in each physical block of the memory array. The memory controller may include a flash translation layer configured to perform the garbage collection and address mapping for the memory controller, and may manage dies across multiple channels (e.g., a first channel, a second channel, etc.). In some embodiments a superblock may be constructed by selecting a physical block from either the first die or the second die that has a lowest amount of valid data for the first channel, and selecting another physical block from either the third die or the fourth die that has a lowest amount of valid data for the second channel. In some embodiments, the superblock may be constructed by selecting multiple physical blocks one or more of the first die or the second die, and selecting multiple physical blocks from one or more of the third die or the fourth die. The size of the superblock may also be dynamically selected for each garbage collection process based, at least in part, on a number of physical blocks needed to be cleared during a given garbage collection process. For example, a first superblock may be constructed according to a first set of rules during a first garbage collection process, and a second superblock may be constructed according to a second set of rules during a second garbage collection process.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, and arrangement of one or more of at least one structure and at least one apparatus facilitating operation of one or more of the structure and the apparatus in a pre-determined way.

As used herein, the phrase "coupled to" refers to structures operatively connected with each other, such as electrically connected through a direct ohmic connection or through an indirect connection (e.g., via another structure).

As used herein, "garbage collection" refers to a process performed on a memory device that includes the recovery of good data (i.e., valid data) from bad data (i.e., invalid data), and re-distribution of the valid data back into the pool of available physical blocks of the memory array.

As used herein, a "superblock" is a virtual (i.e., logical) combination of physical blocks. The linking of a set of physical blocks as a superblock may be managed by the memory controller.

FIG. 1 is a schematic block diagram of a memory device 100 according to embodiments of the present disclosure. The memory device 100 includes a memory controller 110 operably coupled with a memory array 120. The memory array 120 may include non-volatile storage memory that may be written to, read from, and/or erased as controlled by the memory controller 110. The memory array 120 may be physically constructed over one or more physical dies (e.g., multiple integrated circuits), and each physical die (also referred to as "die" or "semiconductor die") may include a fixed number of physical data blocks (also referred to as "physical blocks" or "blocks") that includes a fixed number of pages. The basic unit for a read/write operations is often a page. The basic unit for erase operations is often a block. As an example, a die may include 4 blocks, each block may include 32 pages, and each page may include 512 bytes. Physical dies may also reserve space in the memory array 120 for replacement or spare area. Of course, any specific reference to a number of dies, block size, or other measure of capacity is to be understood as an example. Embodiments of the present disclosure include memory arrays of a variety of different configurations and capacity. For example, memory cells of a block may be configured as single-level cells (SLC) and/or multi-level cells (MLC).

As non-limiting example, the memory array 120 may be configured as non-volatile memory, such as NAND Flash, NOR Flash, erasable programmable read only memory (EPROM), electrically erasable programmable read only memory (EEPROM), ferroelectric RAM (FRAM), magnetoresistive RAM (MRAM) or other suitable non-volatile memory technology or any combination thereof. The memory device 100 may be incorporated within an embedded multi-media controller (also referred to as "embedded MMC" or "eMMC"), Solid State Drives (SSD), Universal Flash Storage (UFS) devices, and/or other devices that utilize non-volatile memory as discussed herein.

The memory controller 110 may be configured to control operation of the memory array 120, including issuing the commands for reading, writing, and/or erasing. In addition, the memory controller 110 may be configured to maintain a logical mapping of the memory array 120 for performing the operations. The logical mapping may include page-level mapping, block-level mapping, and/or hybrid-level mapping. During operation, the memory array 120 may monitor the status of data within the different physical blocks of the memory array 120 to determine if free space is needed and/or if valid data should be moved to different physical blocks improve the operational efficiency.

The memory controller 110 may be configured to perform a function that is generally referred to in the art as "garbage collection." As described above, garbage collection includes the separation and recovery of good data (i.e., valid data) from bad data (i.e., invalid data), and re-distribution of the valid data back into the pool of available physical blocks of the memory array 120. During garbage collection, the memory controller 110 may operate on more than one physical block at a time. This virtual (i.e., logical) combination of physical blocks is referred to as a superblock. Conventionally, superblocks are static such that the same physical blocks are constructed (e.g., linked with each other) as the same superblock each time garbage collection occurs. Occasionally, new superblocks may be formed if a physical block become defective; however, embodiments of the present disclosure include constructing a new superblock dynamically each time garbage collection occurs for the physical blocks regardless of whether any physical blocks are determined to be bad. Rather, the combination of physical blocks created to construct a superblock may be based, at least in part, on the amount of valid data in each of the physical blocks. Additional details of this process will be discussed below with respect to FIGS. 3A-3E and FIG. 4.

Figure 2:
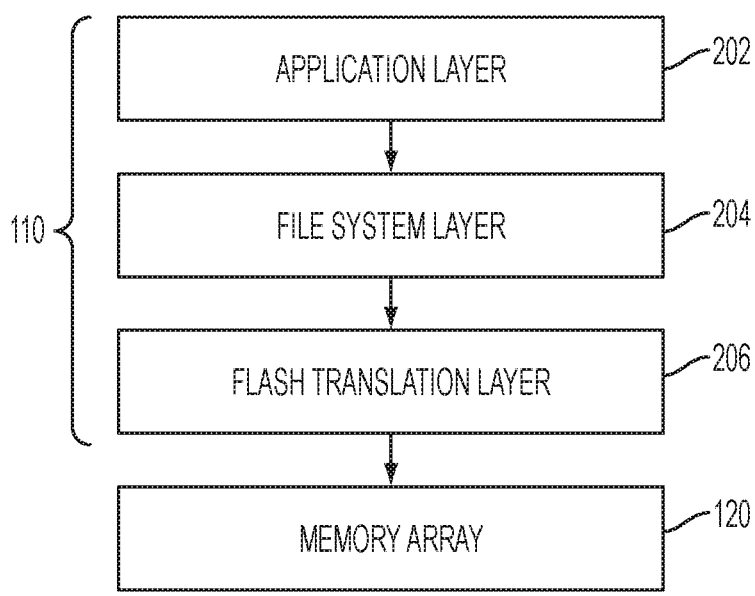
FIG. 2 shows a schematic block diagram of a software architecture for the memory controller of FIG. 1.

FIG. 2 shows a schematic block diagram of a software architecture for the memory controller 110 of FIG. 1. The memory controller 110 may be configured to execute and manage one or more applications (via application layer 202), file systems (via file system layer 204), and translation (via flash translation layer (FTL) 206) when communicating with the memory array 120. The application layer 202 provides high level services for application programs being run by the memory controller 110. The file system layer 204 issues a series of read or write commands each with a logical sector number, to read data from, or write data to, specific addresses in the memory array. The FTL 206 may also emulate the functionality of the physical blocks of the memory array 120, hiding the presence of erase operation and erase-before-write characteristics from the memory array 120.

The FTL 206 may be configured to perform various functions, at least two of which include address translation and garbage collection. The address translation function includes the FTL 206 performing logical-to-physical address mapping (i.e., mapping of a logical system level address to a physical memory address). For example, the FTL 206 may convert the logical sector number issued by the file system layer 204 to a real physical sector number of the memory array 120 (e.g., by a mapping algorithm in the FTL 206). This mapping may include the FTL 206 maintaining a mapping table of virtual addresses from upper software layers to correspond with the physical addresses on the memory array 120. The FTL 206 may also maintain a virtual mapping of multiple physical blocks referred to herein as a "superblock." Thus, superblocks are physical blocks are the logically grouped together by the block management unit of the FTL 206.

The garbage collection function includes the separation and recovery of valid data (i.e., "good" data) from invalid data (i.e., "bad" data), and re-distribution of the valid data into the pool of available physical blocks and erasing invalid data to free up space for additional writes to occur. Superblocks may be maintained for purposes of parallel reading/writing of data, as well as for garbage collection. As discussed herein, the superblocks used for purposes of reading/writing may be different than the superblocks used for garbage collection. In particular, the superblocks used for garbage collection may be dynamically constructed each time garbage collection occurs regardless of the construction of the superblocks used during reading/writing. At each instance of garbage collection, the dynamic superblock may be constructed based on an amount of valid data in each physical block of the memory array 120 so that the number of internal data moves may be reduced when data is relocated prior to being erased.

Figure 3A:
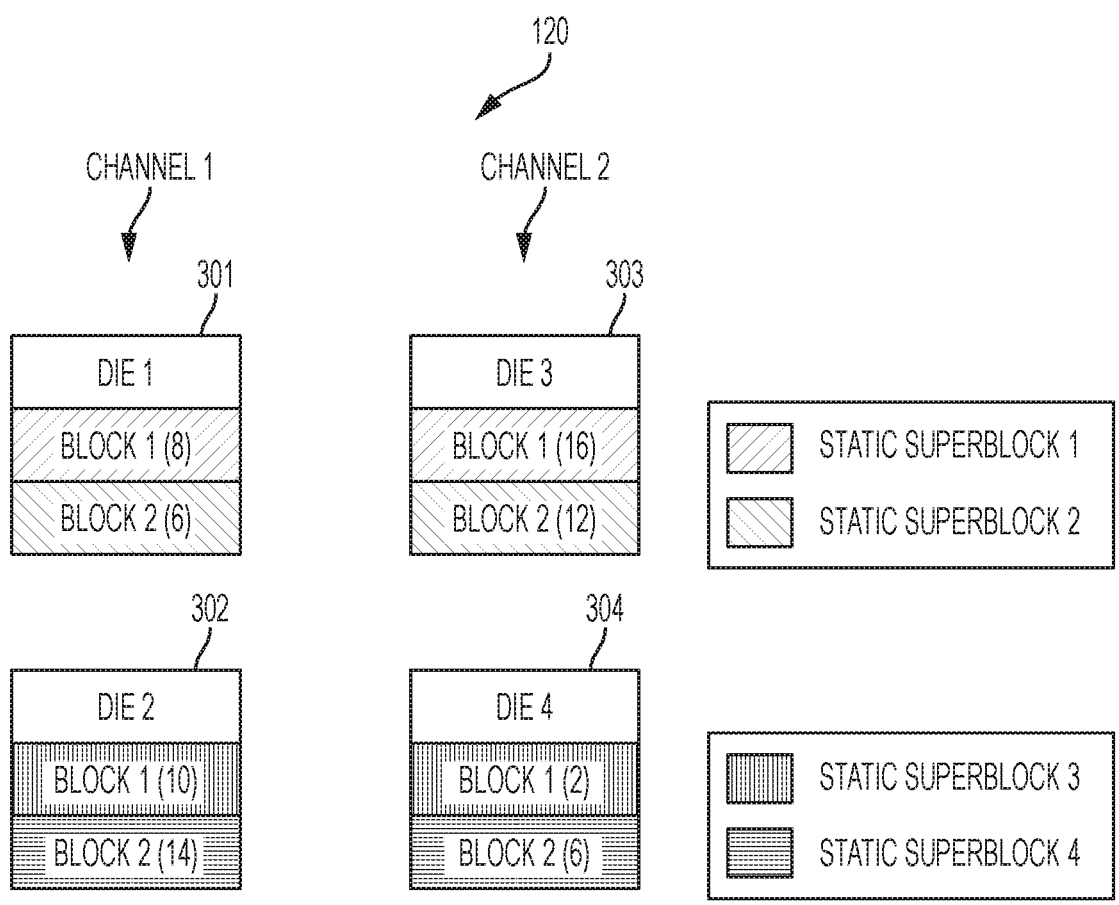
FIGS. 3A through 3E are simplified schematic block diagrams of the memory array of FIG. 1 for the purpose of illustrating garbage collection processes.
Figure 3B:
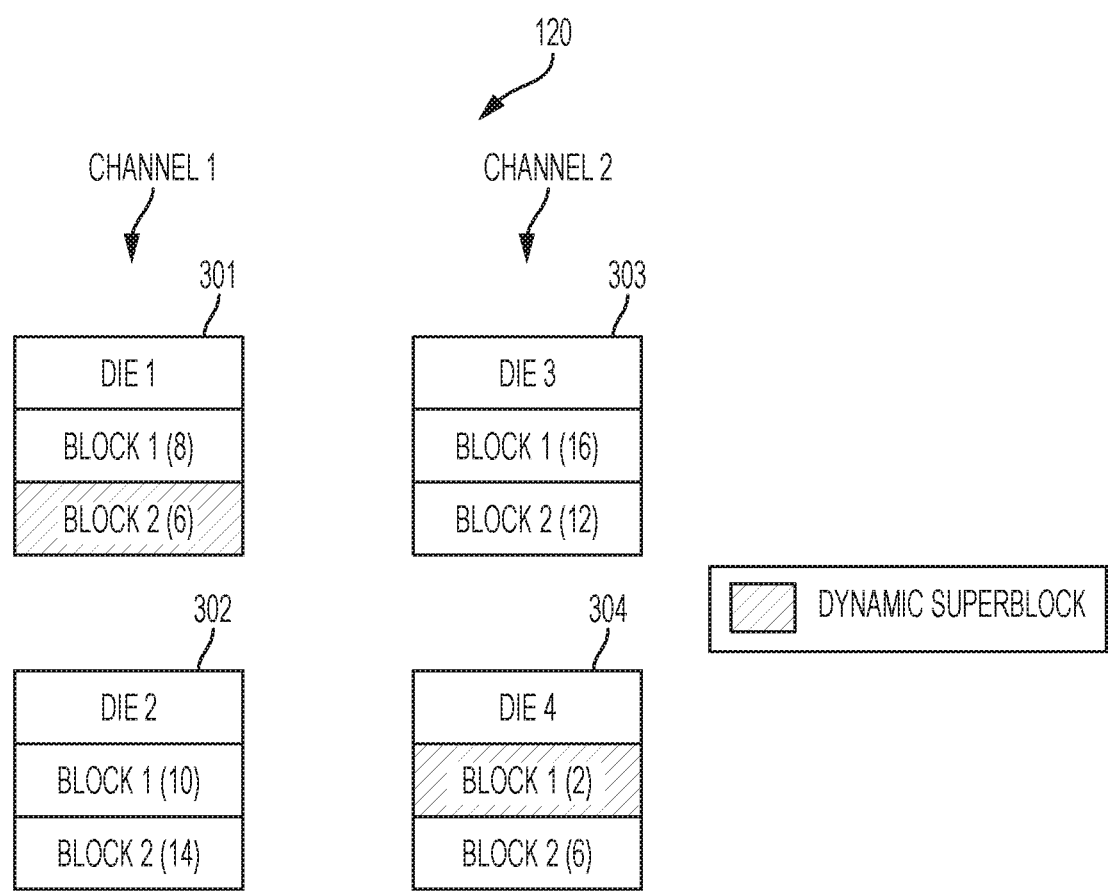

FIGS. 3A through 3E are simplified schematic block diagrams of the memory array 120 of FIG. 1 for the purpose of illustrating garbage collection processes performed by the FTL 206 (FIG. 2). For comparison of functionality, FIG. 3A shows a conventional garbage collection process using static superblocks, and FIG. 3B shows a garbage collection process using dynamic superblocks according to an embodiment of the present disclosure.

Figure 3C:
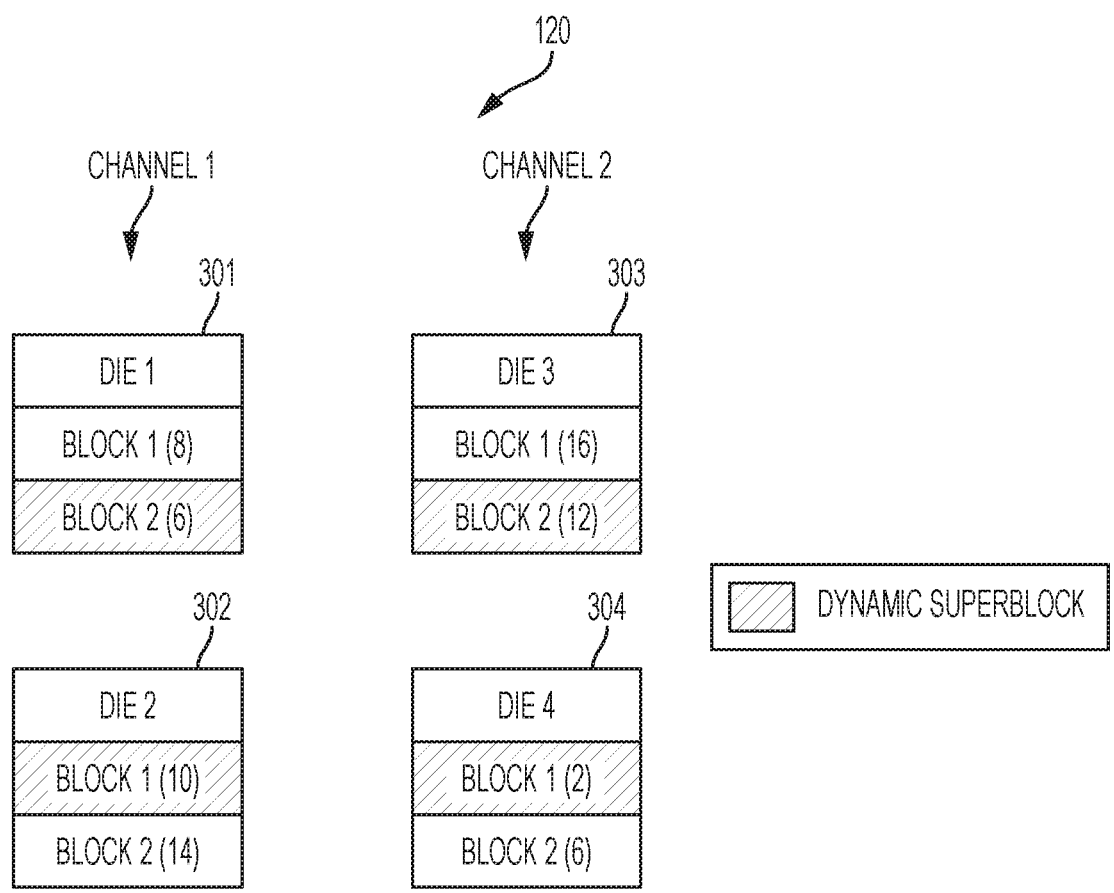

FIGS. 3A through 3C show dies 301, 302, 303, 304 having a plurality of blocks (blocks 1, 2). The dies 301, 302, 303, 304 are managed by two channels (channels 1, 2). A channel may be a hardware unit within the memory controller 110 that enables the memory controller 110 to communicate with a set of dies at the same time. For example, the first channel (channel 1) manages the first die (die 1) 301 and the second die (die 2) 302, while the second channel (channel 2) manages the third die (die 3) 303 and the fourth die (die 4) 304. Each die 301, 302, 303, 304 includes multiple blocks (blocks 1, 2) having data stored in pages therein. Units of valid data are indicated within the blocks in parentheses (e.g., (8), (6), etc.). Two channels are described herein for simplicity; however, it should be recognized that any number of channels are contemplated as embodiments of the present disclosure. Likewise, it should be understood that two dies per channel, and two blocks per die is described herein for simplicity, but that any number of dies and blocks are contemplated as embodiments of the present disclosure.

Referring specifically to FIG. 3A, the FTL 206 may maintain static superblocks across the different channels. Each superblock may have at least one physical block logically linked to another physical block from another die of a different channel. For example, the first static superblock (static superblock 1) may logically link the first block from the first die 301 and the first block of the third die 303, the second static superblock (static superblock 2) may logically link the second block from the first die 301 and the second block of the third die 303, the third static superblock (static superblock 3) may logically link the first block from the second die 302 and the first block of the fourth die 304, and the fourth static superblock (static superblock 4) may logically link the second block from the second die 302 and the second block of the fourth die 304. In some situations, superblocks may be redefined if a physical block becomes defective and is no longer used by the memory array 120. However, so long as the physical blocks remain usable, these superblocks will be defined as such whenever garbage collection occurs due to their static nature. In addition, these superblocks may also be the same superblocks used during parallel read and write operations.

During garbage collection, the FTL 206 may select a static superblock to clean up its physical blocks. In some conventional methods, the FTL 206 may select the static superblock with the least amount of valid data combined among its physical blocks in order to clear the most blocks while moving the least amount of valid data. In the example shown in FIG. 3B, the first static superblock has 24 units of valid data, the second static superblock has 18 units of valid data, the third static superblock has 12 units of valid data, the fourth static superblock has 20 units of valid data. Thus, in some conventional methods, the FTL 206 would select the third static superblock during garbage collection to clean up the first block of the second die and the first block of the fourth die. The FTL 206 would then move the 12 valid data units to another physical block, and then erase the data from its physical blocks. If that process cleared enough free space, the garbage collection process would end; however, if more free space is needed, the FTL 206 would select another superblock (e.g., static superblock 2) to move its valid data to another physical block and erase the data from its physical blocks.

Referring specifically to FIG. 3B, the FTL 206 may construct dynamic superblocks across the different channels each time garbage collection occurs. Each superblock may have at least one physical block logically linked to another physical block from another die of a different channel. During garbage collection, the FTL 206 may construct a dynamic superblock to clean up a set of physical blocks. The FTL 206 may construct each new dynamic superblock by selecting a physical block from the first channel, another physical block from the second channel, as well as physical blocks from additional channels (if any).

The FTL 206 may construct each new dynamic superblock based on the amount of valid data in each physical block of each die. For example, the physical block from each channel may be selected that has the least amount of valid data. In the example shown in FIG. 3B, the FTL 206 may search the dies 301, 302 of the first channel and select block 2 of the first die 301 because (6) is the lowest valid data for physical blocks across the first channel. The FTL 206 may also search the dies 303, 304 of the second channel and select block 1 of the fourth die 304 because (2) is the lowest valid data for physical blocks across the second channel. The FTL 206 would then move the 8 valid data units to another physical block, and then erase physical blocks used in the dynamic superblock. If that process cleared enough free space, the garbage collection process may end; however, if more free space is needed, the FTL 206 may construct another dynamic superblock (e.g., block 1 of the first die 301 and block 2 of the fourth die 304) to move its valid data to another physical block and erase the data from its physical blocks. As a result of the garbage collection process of FIG. 3B, only 8 valid data units were needed to be moved to clear a superblock in contrast to the 12 valid data units for the garbage collection process of FIG. 3A. Thus, the amount of data needed to be relocated may be reduced during garbage collection in comparison to conventional methods.

Referring specifically to FIG. 3C, the FTL 206 may construct a new dynamic superblock by selecting a physical block from each physical die for each channel for a garbage collection process. For example, the new dynamic superblock may include a physical block from the first die 301, a physical block from the second die 302, a physical block from the third die 303, a physical block from the fourth die 304, as well as physical blocks from additional dies (if any). The FTL 206 may construct each new dynamic superblock based on the amount of valid data in each physical block of each die. For example, the physical block from each die may be selected that has the least amount of valid data. In the example shown in FIG. 3C, the FTL 206 may search the dies 301, 302, 303, 304 and select block 2 of the first die 301 because (6) is the lowest valid data for the first die 301, block 1 of the second die 302 because (10) is the lowest valid data for the second die 302, block 2 of the third die 303 because (12) is the lowest valid data for the third die 303, and block 2 of the fourth die 304 because (2) is the lowest valid data for the fourth die 304.

Figure 3D:
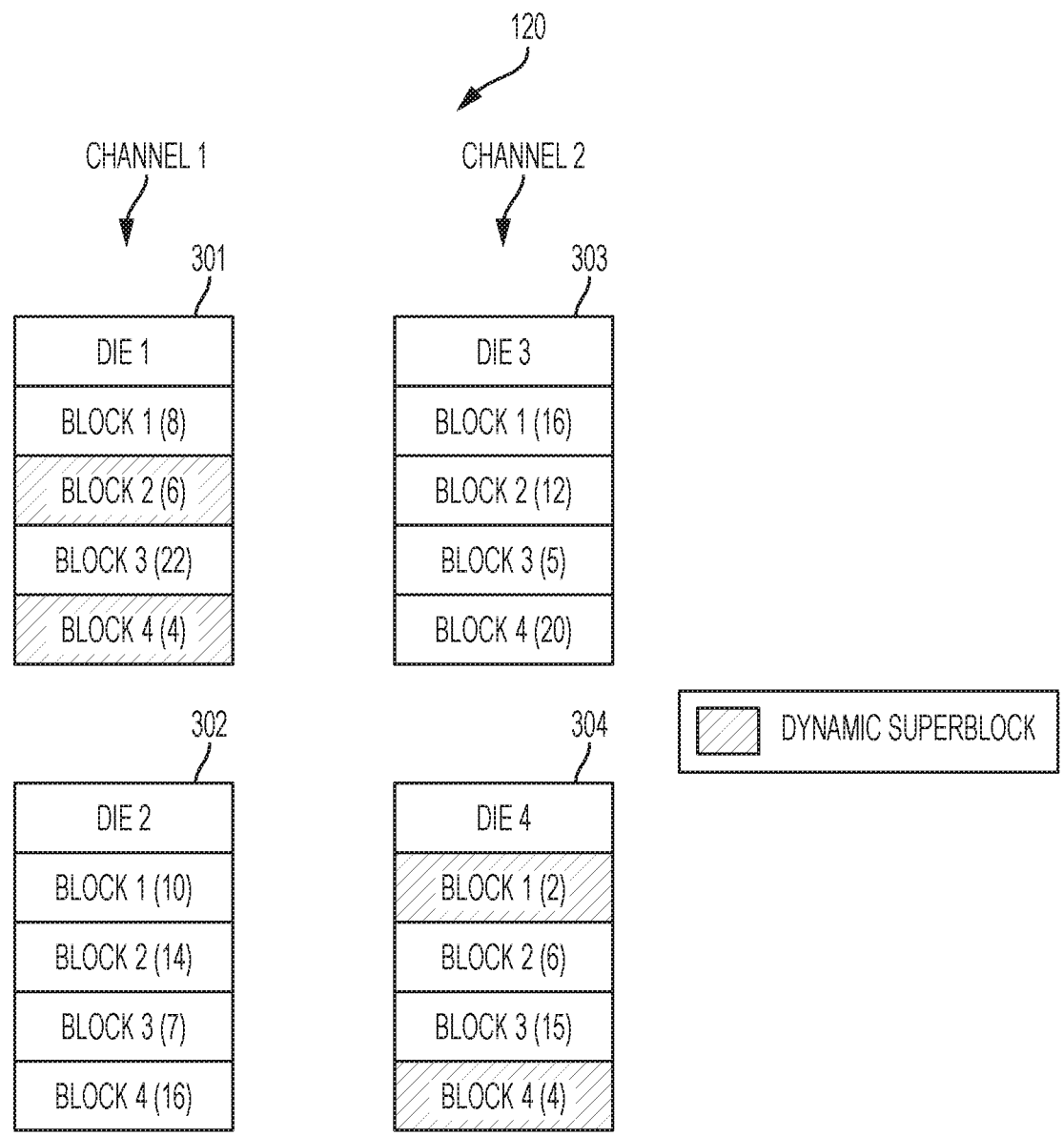
Figure 3E:
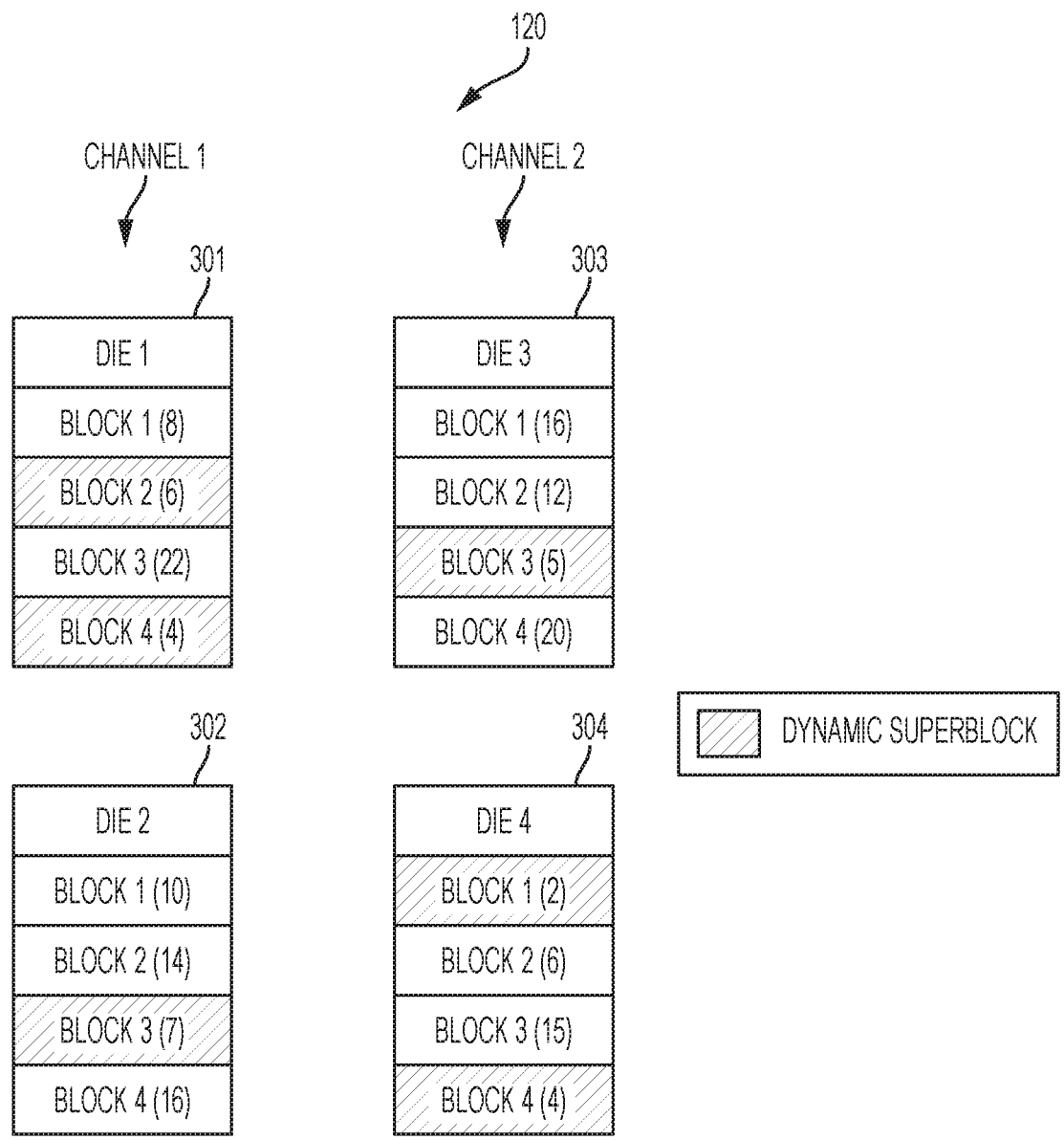

Referring specifically to FIG. 3D, in some embodiments the FTL 206 may construct a new dynamic superblock by selecting multiple physical blocks from the same physical die for a garbage collection process. For example, the new dynamic superblock may include two physical blocks from the first die 301, and two physical blocks from the fourth die 304. As with other embodiments, the FTL 206 may construct the new dynamic superblock based on the amount of valid data in each physical block of each die. For example, the physical block from each die may be selected that has the least amount of valid data. In the example shown in FIG. 3D, the FTL 206 may search the dies 301, 302 and select block 4 of the first die 301 because (4) is the lowest valid data for the dies 301, 302 of the first channel, and block 2 of the first die 301 because (6) is the next lowest valid data for the dies 301, 302 of the first channel. In addition, the FTL 206 may search the dies 303, 304 and select block 1 of the fourth die 304 because (2) is the lowest valid data for the dies 303, 304 of the second channel, and block 4 of the fourth die 304 because (4) is the next lowest valid data for the dies 303, 304 of the second channel.

Additional combinations of blocks and dies are also contemplated as embodiments of the disclosure, which may depend, in part, on the size of the dynamically constructed superblock. For example, constructing a dynamic superblock to include six physical blocks may cause the FTL 206 to add block 3 of the second die 302 and block 3 of the third die 303 as they have the next lowest valid data for each respective channel (see, e.g., FIG. 3E). In some embodiments, the FTL 206 may be configured to construct a superblock that includes physical blocks from dies within a single channel only. In other words, when searching the dies 301, 302, 303, 304, the FTL 206 may not be bound to select blocks from both channels. As a result, a dynamic superblock may be constructed by linking only physical blocks from dies in channel 2 if it so happens that channel 2 includes the blocks with the four lowest valid data for a dynamic superblock having a size of four physical blocks.

Figure 4:
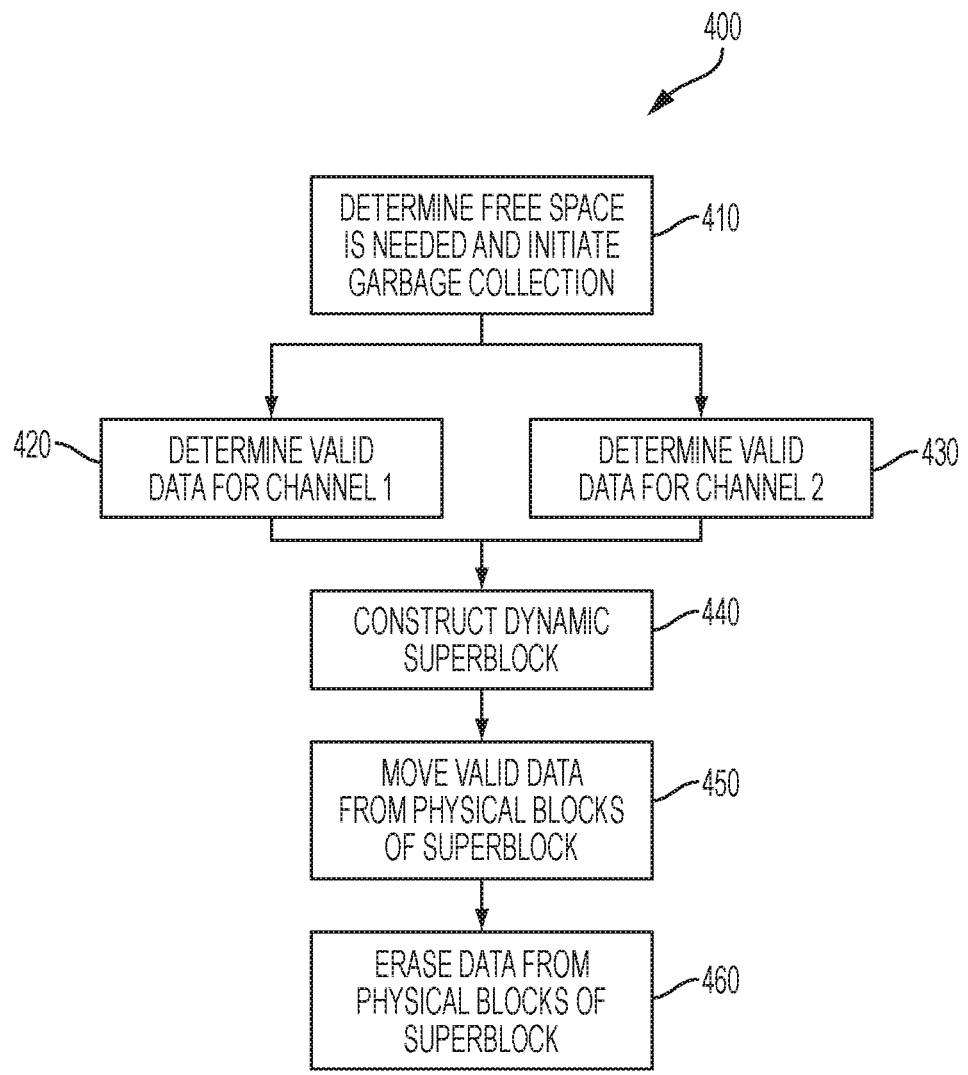
FIG. 4 is a flowchart illustrating a method for performing a garbage collection operation for a memory device according to an embodiment of the disclosure.

FIG. 4 is a flowchart 400 illustrating a method for performing a garbage collection operation for a memory device according to an embodiment of the disclosure. At operation 410, the memory controller (e.g., via firmware for the FTL) may determine that cleanup is desirable to free space in some of the physical blocks of the memory array. Garbage collection may be initiated, and a dynamic superblock may be constructed each time garbage collection is performed.

At operation 420, the memory controller (e.g., via firmware for the FTL) may search through the physical blocks managed by a first channel to determine the amount of valid data for each physical block of each die managed by the first channel.

At operation 430, the memory controller (e.g., via firmware for the FTL) may search through the physical blocks supported by a first channel to determine the amount of valid data for each physical block of each die supported by the first channel. If there are additional channels, additional blocks may be similarly searched.

At operation 440, the dynamic superblock may be constructed including a set of physical blocks that are linked together based, at least in part, on the amount of valid data in each of the physical blocks. In some embodiments, constructing the dynamic superblock includes linking at least one physical block for the first channel with at least one physical block for the second channel. As an example, the dynamic superblock may be constructed with the blocks selected from first channel (operation 420) and/or the second channel (operation 430) and any additional channels. In some embodiments, the physical block from the first channel with the minimum amount of valid data may be selected, and the physical block from the second channel with the minimum amount of valid data may be selected. In some embodiments, multiple physical blocks from the same channel may be selected. The multiple physical blocks from the same channel may or may not on the same die in different embodiments.

At operation 450, valid data may be moved (i.e., relocated) from physical blocks defined by the superblock to available space within another physical block in the memory array. At operation 460, the data in the physical blocks defined by the superblock may be erased.

After the physical blocks are erased, then the firmware can write new data to the newly available space. The firmware may continue to read, write, and/or erase data according to the operation of the application and file system layers until the FTL determines that additional free space is needed and garbage collection is needed. A new dynamic superblock may then be constructed accordingly, which may include different physical blocks depending on the valid data contained within each physical block for die continues and then would do the same operation the next time that cleanup is needed.

In some embodiments, the size of the new dynamic superblock may be determined at the outset (e.g., operation 410) when it is determined that free space is needed. For example, it may be determined that a superblock having four physical blocks is needed for a first garbage collection process. As a result, rules for constructing a superblock with four physical blocks may be employed. In another instance, it may be determined that a superblock having six physical blocks is needed for a second garbage collection process. As a result, rules for constructing a superblock with six physical blocks may be employed. Thus, different sets of rules for constructing different superblocks may be employed depending on the size of superblock needed for a given garbage collection operation.

Figure 5:
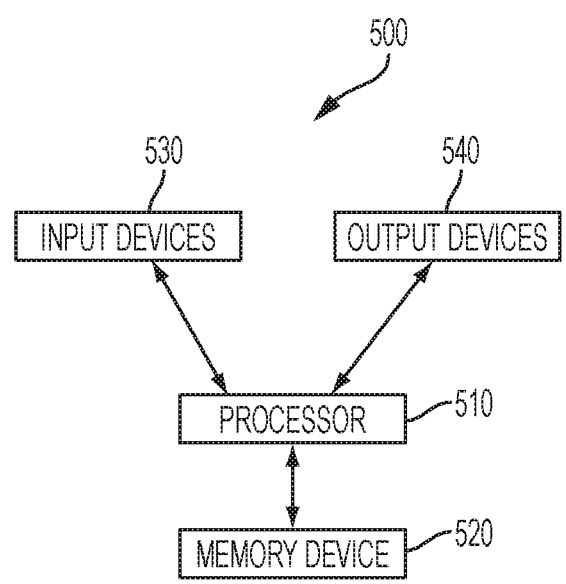
FIG. 5 is a schematic block diagram of an electronic system according to an embodiment of the present disclosure.

FIG. 5 is a schematic block diagram of an electronic system 500 according to an embodiment of the present disclosure. The electronic system 500 includes a processor 510 operably coupled with a memory device 520, one or more input devices 530 and one or more output devices 540. The electronic system 500 may be a consumer electronic device, such as a desktop computer, a laptop computer, a tablet computer, an electronic reader, a smart phone or other type of communication device, as well as any type of computing system incorporating non-volatile storage.

As discussed above, the memory device 520 may be configured to dynamically generate superblocks for a garbage collection process as discussed above. The memory controller (including the FTL) may be integrated with the memory device 520 (e.g., the same chip or circuit board as the physical dies for the memory array). In some embodiments, the memory controller (including the FTL) may be integrated with the processor 510 that is configured to control other features (e.g., run the operating system) of the electronic system 500.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

What is claimed is:

1. A memory device, comprising:
   a memory array comprising a number of dies; and
   a memory controller operably coupled to the memory array, the memory controller configured to:
   determine an amount of valid data in each of:
   first physical blocks of a first die of the number of dies;
   second physical blocks of a second die of the number of dies;
   third physical blocks of a third die of the number of dies; and
   fourth physical blocks of a fourth die of the number of dies, the first and second dies managed by a first channel of the memory controller and the third die and fourth die managed by a second channel of the memory controller, a channel comprising a hardware unit that enables the memory controller to communicate with a set of dies at the same time; and
   dynamically construct a superblock for at least one garbage collection process by selecting at least two physical blocks from the first channel that have a lowest amount of valid data and a second lowest amount of data relative to other physical blocks of the first channel and selecting at least two physical blocks from the second channel that have a lowest amount of valid data and a second lowest amount of valid data relative to other physical blocks of the second channel, the superblock dynamically constructed in a manner that is different than a manner with which superblocks are constructed for reading and writing data, and based, at least in part, on an amount of valid data present in each physical block of the memory array and not a determination of bad physical blocks when constructing the superblock for the at least one garbage collection process.

2. The memory device of claim 1, wherein the memory controller includes a flash translation layer configured to perform garbage collection and address mapping for the memory controller.

3. The memory device of claim 1, wherein the memory controller is further configured to construct the superblock by selecting multiple physical blocks from one or more of the first die or the second die, and selecting multiple physical blocks from one or more of the third die or the fourth die.

4. The memory device of claim 1, wherein the memory controller is further configured to dynamically determine a size for the superblock for the at least one garbage collection process based, at least in part, on a number of physical blocks needed to be cleared during a given garbage collection process.

5. The memory device of claim 4, wherein the memory controller is configured to construct a first superblock according to a first set of rules during a first garbage collection process, and a second superblock according to a second set of rules during a second garbage collection process.

6. The memory device of claim 1, the memory array having non-volatile memory cells configured as at least one of NAND Flash, NOR Flash, erasable programmable read only memory (EPROM), electrically erasable programmable read only memory (EEPROM), ferroelectric RAM (FRAM), or magnetoresistive RAM (MRAM).

7. A memory device, comprising:
physical blocks of memory cells; and
a memory controller configured to dynamically construct a new superblock each time garbage collection occurs for the physical blocks regardless of whether any physical blocks are determined to be bad and different than construction of superblocks used during reading and writing, the new superblock dynamically constructed using at least two physical blocks from a die of a number of dies managed by the memory controller via a channel, and at least two additional physical blocks from another die of an additional number of dies managed by the memory controller via another channel, wherein a channel comprises a hardware unit that enables the memory controller to communicate with a set of dies at the same time.

8. The memory device of claim 7, wherein the memory controller is configured to execute firmware having an application layer, a file system layer, and a translation layer.

9. The memory device of claim 8, wherein the translation layer includes a Flash Translation Layer (FTL) configured to construct the new superblock and perform the garbage collection.

10. The memory device of claim 9, wherein the FTL is configured to construct the new superblock responsive to determining the at least one physical block and the at least one additional physical block have a minimum total amount of valid data.

11. The memory device of claim 10, wherein the at least one physical block includes at least some physical blocks from different dies that comprise the memory cells.

12. The memory device of claim 10, wherein the at least one physical block includes at least some physical blocks from a common die that comprise the memory cells.

13. A method for managing operation of a memory device, the method comprising:
initiating a garbage collection process for a memory array divided into physical blocks of data;
determining an amount of valid data for the physical blocks of data; and
constructing a dynamic superblock via linking at least one physical block of each of a first die and a second die for a first channel with at least one physical block of each of a third die and a fourth die for a second channel, a channel comprising a hardware unit that enables a memory controller to communicate with a set of dies at the same time, the dynamic superblock constructed different than construction of superblocks used during reading and writing and based, at least in part, on the amount of valid data for the physical blocks of data for the memory array at a time of constructing the dynamic superblock for the garbage collection process and not responsive to a determination of physical blocks to be bad.

14. The method of claim 13, further comprising:
moving valid data for physical blocks selected for construction of the dynamic superblock; and
erasing the physical blocks selected for construction of the dynamic superblock.

15. The method of claim 13, wherein initiating the garbage collection process includes:
separating and recovering valid data from invalid data for the physical blocks of the dynamic superblock;
re-distributing the valid data into a pool of available physical blocks outside of the dynamic superblock; and
erasing the physical blocks of the dynamic superblock to free up space therein for additional writes to occur.

16. The method of claim 13, wherein determining the amount of valid data for the physical blocks of data includes:
searching through physical blocks for each die managed by the first channel to determine valid data for each physical block of the first channel; and
searching through physical blocks for each die managed by the second channel to determine valid data for each physical block of the second channel.

17. The method of claim 13, wherein linking at least one physical block of each of the first die and the second die for the first channel with at least one physical block of each of the third die and the fourth die for the second channel includes:
selecting the at least one physical block of each of the first die and the second die for the first channel having a minimum amount of valid data among the physical blocks for the first channel; and
selecting the at least one physical block of each of the third die and the fourth die for the second channel having a minimum amount of valid data among the physical blocks for the second channel.

18. An electronic system, comprising:
a memory device including dies having physical blocks, the memory device configured to link a first set of at least two physical blocks from at least two different dies managed via a first channel and a second set of at least three physical blocks from at least two different dies managed via a second channel to dynamically construct a superblock responsive to a garbage collection process in a manner that is different than construction of superblocks used for reading and writing data before and after the second garbage collection process, a channel comprising a hardware unit that enables the memory device to communicate with a set of dies at the same time.

19. The electronic system of claim 18, further comprising at least one of an embedded multi-media controller (eMMC), a Solid State Drive (SSD), or a Universal Flash Storage (UFS) devices that includes the memory device.

20. The electronic system of claim 18, further comprising at least one processor coupled to the memory device, at least one input device coupled to the processor, and at least one output device coupled to the processor.

21. The electronic system of claim 18, wherein the first set of at least three physical blocks includes at least two physical blocks from the same die.

* * * * *